US008954495B2

(12) United States Patent
Cohen et al.

(10) Patent No.: US 8,954,495 B2
(45) Date of Patent: Feb. 10, 2015

(54) PROXY APPLICATION WITH DYNAMIC FILTER UPDATING

(71) Applicant: Netflix, Inc., Los Gatos, CA (US)

(72) Inventors: Michael Cohen, Santa Cruz, CA (US); Benjamin Schmaus, San Jose, CA (US); Matthew Hawthorne, Los Gatos, CA (US); Benjamin Christensen, San Jose, CA (US); Daniel Jacobson, Los Altos, CA (US)

(73) Assignee: Netfilx, Inc., Los Gatos, CA (US)

( * ) Notice: Subject to any disclaimer, the term of this patent is extended or adjusted under 35 U.S.C. 154(b) by 211 days.

(21) Appl. No.: 13/734,864

(22) Filed: Jan. 4, 2013

(65) Prior Publication Data
US 2014/0195645 A1 Jul. 10, 2014

(51) Int. Cl.
G06F 15/16 (2006.01)
H04L 29/08 (2006.01)

(52) U.S. Cl.
CPC ...................... H04L 67/32 (2013.01)
USPC .......................................... 709/203; 709/219

(58) Field of Classification Search
USPC ........... 709/203–219, 223–229, 250; 718/105
See application file for complete search history.

(56) References Cited

U.S. PATENT DOCUMENTS

| 6,408,336 | B1* | 6/2002 | Schneider et al. | 709/229 |
|---|---|---|---|---|
| 7,272,625 | B1* | 9/2007 | Hannel et al. | 709/200 |
| 7,437,482 | B2* | 10/2008 | Jungck | 709/246 |
| 7,580,919 | B1* | 8/2009 | Hannel et al. | 1/1 |
| 7,849,507 | B1* | 12/2010 | Bloch et al. | 726/22 |
| 7,912,856 | B2* | 3/2011 | Hannel et al. | 707/781 |
| 8,302,180 | B1* | 10/2012 | Gudov et al. | 726/13 |
| 8,370,936 | B2* | 2/2013 | Zuk et al. | 726/23 |
| 8,413,111 | B2* | 4/2013 | Paster | 717/106 |
| 8,782,221 | B2* | 7/2014 | Han | 709/224 |
| 2005/0273849 | A1* | 12/2005 | Araujo et al. | 726/12 |
| 2008/0172366 | A1* | 7/2008 | Hannel et al. | 707/3 |
| 2011/0231443 | A1* | 9/2011 | Hannel et al. | 707/776 |
| 2012/0023236 | A1* | 1/2012 | Backholm et al. | 709/226 |
| 2013/0205366 | A1* | 8/2013 | Luna et al. | 726/1 |
| 2014/0059646 | A1* | 2/2014 | Hannel et al. | 726/3 |
| 2014/0177497 | A1* | 6/2014 | Backholm et al. | 370/311 |

* cited by examiner

Primary Examiner — Sargon Nano
(74) Attorney, Agent, or Firm — Hickman Palermo Truong Becker Bingham Wong LLP

(57) ABSTRACT

The disclosure describes a proxy server application that supports the dynamic modification of proxy rules implemented by a proxy server. The proxy rules implemented by the proxy server specify network behaviors to be performed at various points during the handling of requests from client applications. A proxy server implements the proxy rules by processing one or more user-generated network traffic filters for managing network traffic. In an embodiment, users generate network traffic filters by creating network traffic filter source code that specify processing steps to be performed by a proxy server relative to network messages the proxy server receives. In an embodiment, user-generated network traffic filters may be added, removed, reordered, or otherwise modified in a proxy server application at runtime in order to respond to current network conditions or to achieve other desired proxy configurations.

20 Claims, 8 Drawing Sheets

```
1  class VendorTvDelay extends proxy Filter {
2
3      def static Random rand = new Random()
4      @Override
5      String filterType() {                                          402
6          return 'pre'
7      }
8      @Override
9      int filterOrder() {                                            404
10         return 5
11     }
12     boolean shouldFilter() {
13         return RequestContext.getRequest().getParameter("deviceID")?.equals("vendortv"):false    406
14     }
15
16     Object run() {
17         sleep(rand.nextInt(20000))                                 408
18     }
19 }
20 }
```

PROXY APPLICATION WITH DYNAMIC FILTER UPDATING

TECHNICAL FIELD

The present disclosure generally relates to the use of proxy servers in computer networks. The disclosure relates more specifically to a proxy server application that provides for dynamic updating of defined network behaviors implemented by a proxy server.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The servers that provide some of the most popular web-based services in networked computing may often attract network traffic from thousands of client device types that in total generate millions, or even billions, of network requests on a daily basis. In order to efficiently handle network traffic levels of these scales, among other reasons, web-based application providers commonly utilize proxy servers in web-based application network infrastructures. In general, a proxy server acts as an intermediary between requesting clients and the origin servers that process the client requests. In this manner, proxy servers provide a centralized point of ingress and egress for network traffic in a web-based application network infrastructure and enable the implementation of various network policies or functions at the proxy in order to reduce processing demands on the origin servers, manage the flow of network traffic, and gain insights into system behavior. Examples of policies or functions include caching, diagnosing error conditions, load balancing, and authentication, and authorization.

Certain proxy servers are primarily implemented as application software that runs on a server and are generally configured for specific situations. However, existing proxy server applications have a number of disadvantages. For example, existing proxy server applications provide primarily for the specification of statically defined network behaviors that are configurable in only a limited number of ways defined by the application. Further, even minor modifications to existing proxy server applications typically require the redeployment or rebooting of the entire proxy server application to any proxy servers running the application. These factors and others often complicate the challenge of responding to the ever-changing network conditions in web-based application environments that often call for timely modifications to be made to proxy server configurations in order to protect back-end systems, combat rogue clients, diagnose problems, modify application behavior, and otherwise ensure the accessibility of web-based services.

BRIEF DESCRIPTION OF THE DRAWINGS

In the drawings:

FIG. 4 illustrates an example network traffic filter source code file;

DETAILED DESCRIPTION OF EXAMPLE EMBODIMENTS

Figure 1:
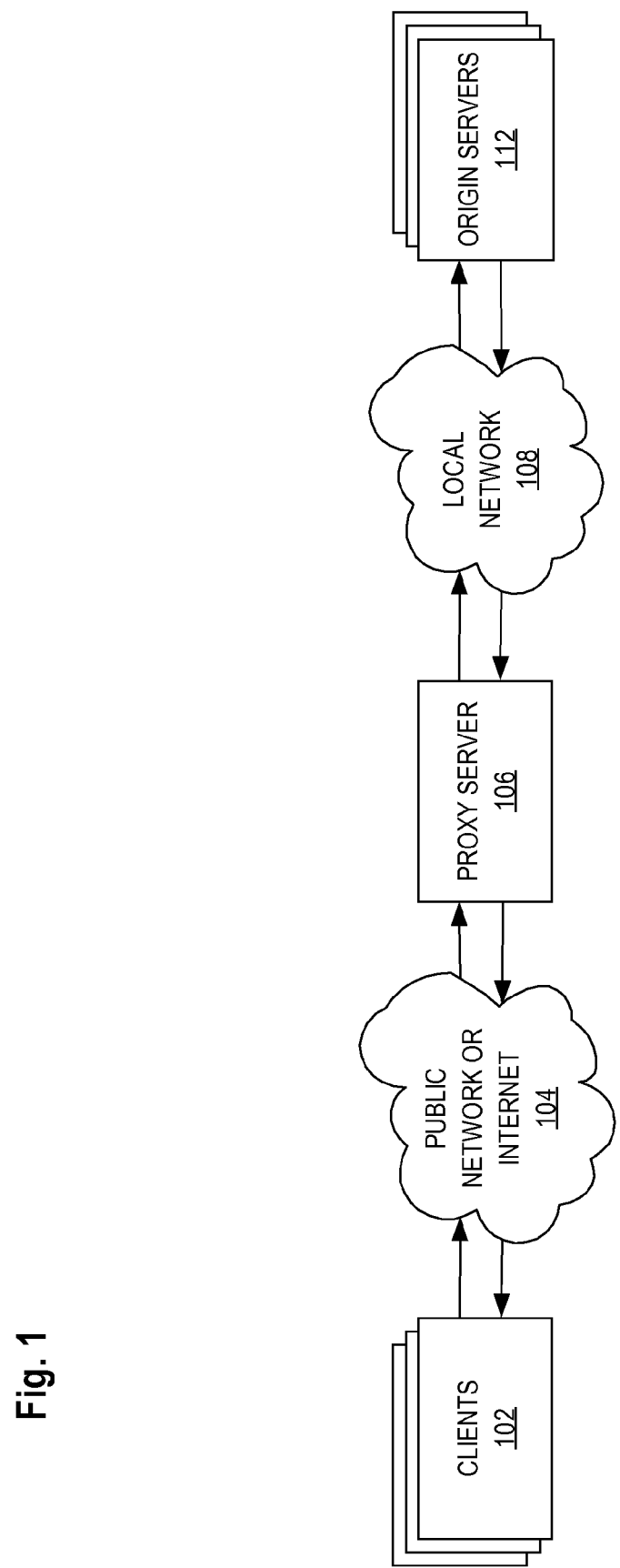
FIG. 1 illustrates a proxy server in a computer network.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
    1.0 General Overview
    2.0 Structural and Functional Overview
    3.0 Proxy Server Application Overview
        3.1 Network Traffic Filters
        3.2 Overview of Example Operation
    4.0 Implementation Mechanisms—Hardware Overview
    5.0 Other Aspects of Disclosure
    1.0 General Overview In one embodiment, the disclosure describes a proxy server application that supports the dynamic modification of defined proxy rules implemented by a proxy server. In general, in an embodiment a proxy server is configured to receive requests from clients directed toward one or more origin servers, dispatch the requests to origin servers for processing, receive responses from the origin servers, and send the responses back to the requesting clients. The proxy rules implemented by the proxy server specify desired network behaviors to be performed at various points during the handling of client requests by the proxy server.

In an embodiment, a proxy server implements particular proxy rules by processing one or more network traffic filters. In this context, a network traffic filter refers to an executable unit of computer program code that performs one or more processing steps relative to a network message received by a proxy server. Network traffic filters may comprise virtually any processing actions to be performed by a proxy server in order to respond to current network conditions or otherwise achieve desired proxy configurations. In an embodiment, a proxy server processes network traffic filters as part of one or more network traffic filter chains, with each filter chain including one or more individual network traffic filters and corresponding to a particular point or other event during the handling of a network message received by the proxy server.

In an embodiment, users may generate network traffic filters by specifying the attributes of the network traffic filters in one or more filter source code files. In an embodiment, user-created filter source code files may specify one or more of the following network traffic filter attributes: an associated filter chain, a processing order relative to other filters, one or more filter processing actions, criteria for performance of the processing actions, and other functions. In an embodiment, users may create and distribute, or publish, new and/or updated filter source code files to a centralized data repository that stores and makes the filter source code files available for use by one or more proxy server applications.

In an embodiment, a proxy server application enables dynamic updating of proxy rules by periodically retrieving published filter source code files from a data repository and loading the filter source code files at runtime to be processed by the proxy server application as one or more network traffic filter objects, also referred to herein as network traffic filters. "Dynamic updating," in this context, includes loading a new network traffic filter into the proxy server application, or removing a particular network traffic filter in the proxy server application, or changing the processing order or other functionality of an existing network traffic filter in the proxy server application, or moving a particular network traffic filter from a first filter chain or set of network traffic filters to a different filter chain or set of network traffic filters in the proxy application, at runtime without pausing, stopping or restarting the proxy server application and without a full deployment of the proxy server application.

2.0 Structural and Functional Overview

FIG. 1 illustrates a proxy server 106 in a network. In the example of FIG. 1, computer clients 102 are coupled directly or indirectly through one or more networks 104 to a proxy server 106. The proxy server 106, which may comprise a computer or a process hosted on or executed on other elements of FIG. 1, is coupled directly or indirectly through one or more networks 108 to one or more origin servers 112. In this arrangement, the proxy server 106 intermediates communication between clients 102 and applications residing on the distributed set of origin servers 112, which may be interconnected by a wide area network and/or local area network. There may be a multitude of proxy servers 106 in other embodiments, but one proxy server 106 is shown in FIG. 1 for the purposes of illustrating a clear example.

In an embodiment, clients 102 generally include any computing devices capable of requesting services over a network and include, for example, personal computers, smartphones, tablet computers, processor-equipped televisions, set-top boxes, game consoles, digital video recorders, etc. Networks 104, 108 each comprises a computer network, such as, for example, a local area network (LAN), wide area network (WAN), or internetwork such as the Internet. Networks 104, 108 may contain additional network elements such as routers. In the context of a proxy arrangement, typically network 104 is the Internet or other WAN and network 108 is a LAN, but the present disclosure is not limited to this network arrangement and other network arrangements including proxy server 106 are within the scope of the present disclosure.

In an embodiment, origin servers 112 comprise one or more computing devices that host, execute, or otherwise implement one or more applications that provide various resources or services over a network to requesting clients. For example, origin servers 112 may comprise web servers, database servers, media content streaming servers, or any other types of application servers. In general, origin servers 112 respond to incoming requests from clients for some resource or service by processing the request and providing a response to the requesting client.

In an embodiment, proxy server 106 is a network element, computer program, or some combination thereof, that acts as an intermediary for requests from clients 102 seeking resources from one or more origin servers 112. In the network arrangement illustrated in FIG. 1, proxy server 106 may be referred to a "reverse" proxy server due to its proximity to the origin servers 112 in the network arrangement. In an embodiment, proxy server 106 is a Hypertext Transfer Protocol (HTTP) proxy and proxies HTTP requests from clients 102 directed toward origin servers 112, however, the proxy server application described herein is generally applicable to any network traffic protocol and is not limited to proxying HTTP requests.

In operation, as one of clients 102 sends a request for a resource or service provided by an origin server 112, the request traverses through the proxy server 106. In an embodiment, in response to receiving a network request, a proxy server application running on proxy server 106 performs one or more processing steps, as described in further detail herein, and dispatches the request on to one or more of origin servers 112. In response to receiving a dispatched request from proxy server 106, an origin server 112 processes the request and generates a response message that is returned to proxy server 106. In an embodiment, in response to receiving a response message from an origin server 112, the proxy server application running on proxy server 106 may perform one or more additional processing steps before sending the response message back to the requesting client of clients 102.

Figure 2A:
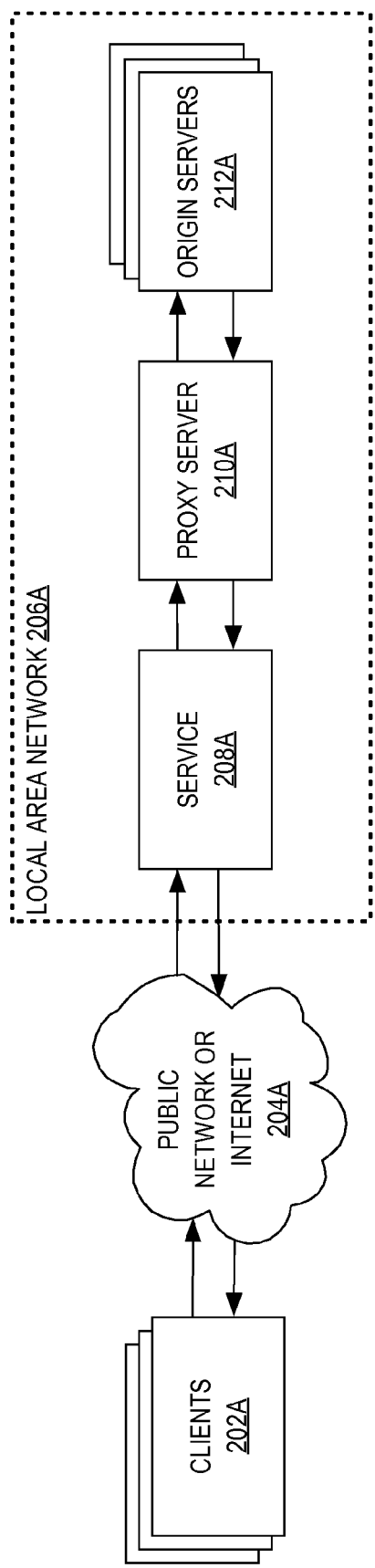
FIG. 2A illustrates a first example proxy server application arrangement in a local area network.
Figure 2B:
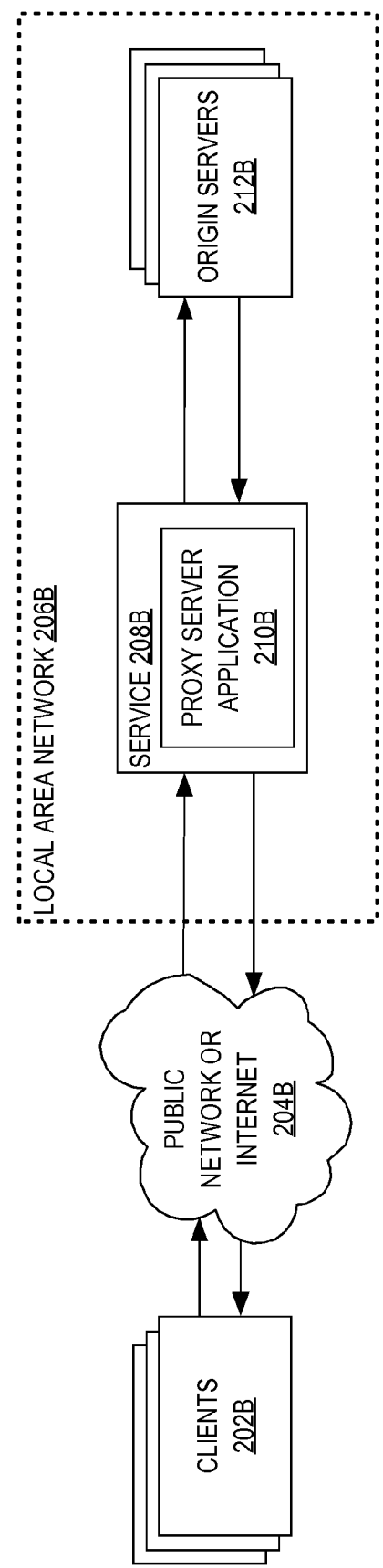
FIG. 2B illustrates a second example proxy server application arrangement in a local area network.

In various embodiments, a proxy server application may be utilized in network architectures as a separate server tier or embedded in an existing service. FIGS. 2A, 2B illustrate example proxy server application arrangements. Referring first to FIG. 2A, a proxy server 210A comprises a stand-alone computer tier in a local area network 206A. In FIG. 2A, service 208A may comprise an application program hosted on a computer that receives requests from clients 202A over a network 204A and communicates with origin servers 212A in order to process client requests. For example, service 208A may be an application programming interface (API) service that receives requests from clients 202A and sends additional requests to origin servers 212A in order to service the requests from clients 202A. In this arrangement, proxy server 210A may be arranged between the service 208A and origin servers 212A. In an embodiment, proxy server 210A comprises a proxy server application and intermediates requests between service 208A and origin servers 212A, performing one or more processing steps on network messages that traverse through proxy server 210A.

In another embodiment, FIG. 2B illustrates an example of a proxy server application embedded in a service 208B. For example, service 208B may receive requests from clients 202B over network 204B and, similarly to service 208A described above, service 208B may reroute the requests or send additional requests to origin servers 212B in order to process requests from clients 202B. In an embodiment, instead of adding an additional standalone proxy server tier between service 208B and origin servers 212B, a proxy server application 210B instead may be embedded in service 208B. In the example of FIG. 2B, requests sent from service 208B to origin servers 212B are intercepted and processed by the embedded proxy server application 210B in a similar manner as if proxy server application 210B was installed on a separate server tier.

The proxy server application deployment arrangements illustrated in FIG. 2A, 2B are provided as examples, and the techniques described herein are not limited to these network arrangements.

3.0 Proxy Server Application Overview

Figure 3A:
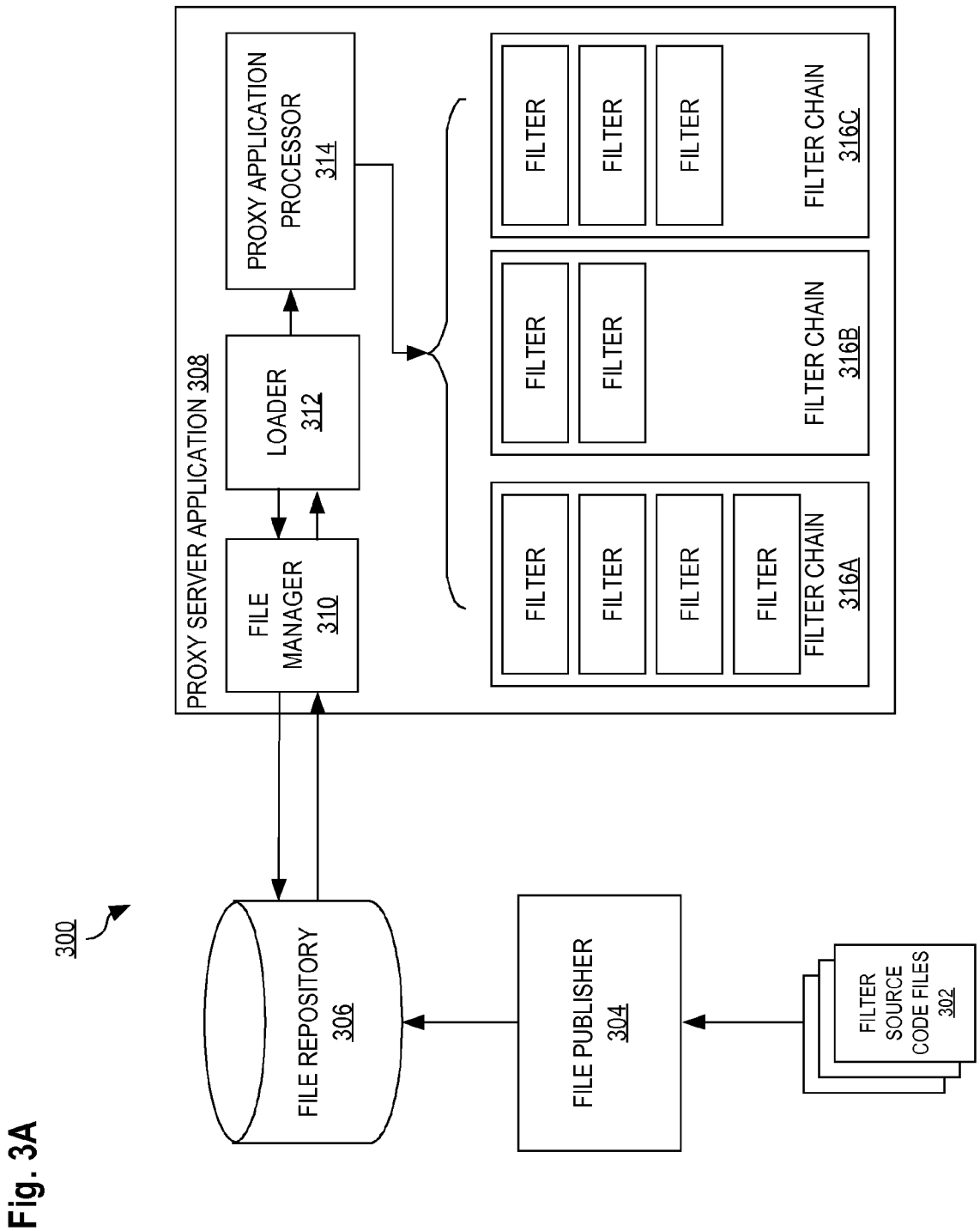
FIG. 3A illustrates an example of an architecture for a proxy server application.

FIG. 3A illustrates a computer system 300 that includes an example architecture for a proxy server application that enables dynamic updating of network traffic filters. The computer system 300 includes a file publisher 304, file repository 306, and a proxy server application 308. In an embodiment, proxy server application 308 comprises a file manager 310, a loader 312, proxy application processor 314, and network traffic filter chains 316A-316C. Each of the file publisher 304, file repository 306, proxy server application 308, file manager 310, loader 312, proxy application processor 314, and network traffic filter chains 316A-316C may be implemented, in various embodiments, as one or more computer programs, code segments, scripts, configuration files, firmware, hardware logic, special-purpose computers, or a combination thereof.

Referring now to FIG. 3A, a file publisher 304 is configured to manage the storage of user-generated filter source code files 302 in a file repository 306. In an embodiment, the user-generated filter source code files 302 comprise program code and other logic that form the basis of network traffic filters used by a proxy server application 308. For example, a filter source code file may be a user-generated scripting language source file comprising program code specifying one or more desired proxy rules. In an embodiment, users may create the filter source code files 302 using a dynamic scripting language such as the Groovy programming language. The Groovy programming language is based on open source software currently available online at the Internet domain groovy.codehaus.org. As described in further detail below, use of a dynamic scripting language such as Groovy enables user-generated program code to be dynamically loaded into a proxy server application at runtime for execution by the proxy server application. The Groovy programming language is provided only as an example, and the present disclosure is not limited to any particular programming language.

A user may create a filter source code file locally on the user's computer and desire that the filter source code file be made available to a proxy server application 308 in order for the filter source code file to be loaded as an active network traffic filter for use by the proxy server application. In an embodiment, a user may cause a filter source code file to be made available to proxy server application 308 by storing the filter source code file in a file repository 306 via a file publisher 304. For example, file publisher 304 may be a command line tool or other application program that enables a user to transmit and store user-generated filter source code files in a file repository 306. Other techniques for publishing user-generated filter source code files to a file repository 306 may be used according to the requirements of the implementation at hand and the present disclosure is not limited to any particular technique by which filter source code files are stored in a file repository 306.

In an embodiment, file repository 306 stores the user-generated filter source code files and causes stored filter source code files to be available to a proxy server application 308. In general, a file repository 306 provides a centralized storage location of user-generated filter source code files that is accessible to any of the proxy servers that are configured to implement the proxy rules defined by the filter source code files in the repository. File repository 306 may be implemented using a data storage mechanism such as, for example, a database system or a commonly mounted file system. A proxy server application 308 may access file repository 306 over a network, or the file repository may be stored locally on a proxy server hosting the proxy server application. In some embodiments, file repository 306 is implemented using the Apache Cassandra distributed database management system. Apache Cassandra is open source software maintained by the Apache Software Foundation and currently available online at the Internet domain cassandra.apache.org.

In FIG. 3A, proxy server application 308 retrieves and loads user-generated filter source code files for use from a file repository 306 using a file manager 310 and a loader 312. In an embodiment, file manager 310 may poll file repository 306 and periodically determines whether the repository contains new filter source code files or updated versions of filter source code files currently loaded by proxy server application 308. In an embodiment, in response to determining that one or more new and/or updated filter source code files are available in file repository 306, file manager 310 retrieves any new and/or updated filter source code files from file repository 306 and stores the filter source code files locally in one or more directories on a proxy server hosting proxy server application 308.

In an embodiment, new and/or updated filter source code files retrieved from file repository 306 by file manager 310 are sent to a loader 312. In an embodiment, file manager 310, loader 312, or another process may poll the directories storing the filter source code files on the proxy server for changes and push any new and/or updated filter source code files to the loader 312.

In an embodiment, filter source code files pushed to the loader 312 are dynamically compiled and loaded as program objects that may be accessed by proxy application processor 314 at runtime without ending or restarting execution of the proxy server application 308. In this context, dynamic compilation of the filter source code files includes translating, at runtime, the filter source code files into a binary form that is stored in computer memory. In an embodiment, dynamic loading may comprise a virtual machine creating program objects, representing network traffic filters, in computer memory from the compiled binary form of the filter source code files. For example, proxy server application 308 may be running in a Java virtual machine (JVM) or other similar virtual machine framework that enables dynamic compilation and class loading. For example, filter source code files 302 may be coded in a scripting language or other programming language capable of being dynamically compiled into classes and loaded into a JVM. In an embodiment, the resulting program objects created by the loader 312 correspond to one or more network traffic filters to be processed by proxy application processor 314. The dynamic loading of user-generated filter source code files by loader 312 into active network traffic filters enables new and/or updated network traffic filters to be injected into proxy server application 308 without requiring a static binary version of proxy server application 308 to be re-built and re-deployed to a proxy server hosting the proxy server application.

In an embodiment, the program objects loaded by loader 312 may be cached in memory. The cached program objects may be used, for example, in the event it is desired to roll back to a previous version of a network traffic filter based on the program objects. For example, a user may determine that the most recent update to a particular network traffic filter is operating improperly and in response, the user may cause proxy server application 308 to revert to an older cached version of the program object corresponding to the particular network traffic filter until the issue is resolved.

In an embodiment, a proxy application processor 314 processes the network traffic filters loaded by loader 312 in response to a proxy server hosting proxy server application 308 receiving network messages or the occurrence of other network message processing events. Processing network traffic filters, in this context, may comprise executing the network traffic filters and providing, as input, information about one or more network messages or events. For example, in response to proxy server application 308 receiving a client request network message, proxy application processor 314 may process one or more particular loaded network traffic filters associated with the processing of client requests. As another example, another set of loaded network traffic filters may be processed in response to receiving a response message from an origin server, or during other points of handling received network messages.

In an embodiment, proxy application processor 314 processes loaded network traffic filters according to one or more network traffic filter chains. A network traffic filter chain may comprise one or more individual network traffic filters, organized in a serial sequence, and corresponding to a particular processing phase or event during the handling of network messages by proxy server application 308. In an embodiment, proxy application processor 314 includes logic that determines, in response to the occurrence of particular network message processing phases or events, which one or more particular filter chains to process and an order in which to process the network traffic filters within the particular filter chains.

Referring to FIG. 3A, network traffic filter chains 316A-316C illustrate three example network traffic filter chains loaded by proxy server application 308, with each filter chain comprising a number of network traffic filters. For example, filter chain 316A may correspond to a "pre-processing" phase for received network requests, and may comprise network traffic filters that perform processing steps on network requests received by proxy server application 308 before the requests are dispatched to an origin server. Network traffic filter chain 316B may correspond, for example, to a dispatch phase of handling a network message and may include one or more network traffic filters that implement logic for dispatching received network request messages to one or more origin servers. Network traffic filter chain 316C may correspond to a "post-processing" phase of handling a network message and include one or more network traffic filters that process a response network messages received by proxy server application 308 before sending the response to the requesting client.

The network traffic filter chains illustrated in FIG. 3A are provided only as examples and fewer or more network traffic filter chains may be defined in a proxy server application than those illustrated in FIG. 3A. For example, other possible network traffic filter chains include an "error" network traffic filter chain that includes network traffic filters configured to respond to errors that occur in one or more of the other network traffic filters. Another example network traffic filter chain is a "static" filter chain that performs processing on a network request and returns a response to a requesting client without proxying the request to an origin server. In an embodiment, network traffic filters in a first filter chain may trigger the execution of one or more second filter chains during processing of the first filter chain. In this manner, arbitrary hierarchies of filter chains may be defined.

In an embodiment, network traffic filters currently loaded by proxy server application 308 may also be unloaded from the proxy server application. For example, if it is discovered that a particular loaded network traffic filter does not operate as intended or is no longer desired, a user may cause the particular network traffic filter to be unloaded from the proxy server application 308. After unloading a particular network traffic filter, a proxy server application 308 no longer includes the particular network traffic filter in its processing of network messages.

In an embodiment, a user may cause a proxy server application 308 to unload a particular network traffic filter by causing the filter source code file representing to the particular network traffic filter to be removed from file repository 306. For example, a user may use file publisher 304 or another mechanism to remove a particular filter source code file or otherwise indicate to a proxy server application 308 that a particular network traffic filter is no longer intended for use by proxy server application 308. In an embodiment, during the polling of file repository 306 by file manager 310, the file manager may detect that the filter source code files representing one or more currently loaded network traffic filters are no longer available in the repository. In response to determining that the filter source code files are no longer available in the repository, file manager 310 may remove the corresponding filter source code files stored on the proxy server hosting proxy server application 308 and further cause the one or more particular network traffic filters to be unloaded and no longer processed by proxy server application 308.

3.1 Network Traffic Filters

In an embodiment, network traffic filters may encode or define one or more proxy rules to be implemented by a proxy server and specified criteria for the execution of those proxy rules. The proxy rules defined by network traffic filters may implement a wide variety of processing actions relative to network messages received by a proxy including, for example, authenticating and/or validating network requests, modifying the content of a network message, modifying the behavior of applications in a network, and implementing various traffic management and load-balancing policies. In general, network traffic filters are able to modify any aspect of a network message as it traverses through a proxy server hosting a proxy server application. Network traffic filters may also access other environmental variables made accessible to the network traffic filters by a proxy server application. For example, a proxy server application may information related to track network traffic volume levels, status information about the proxy server, or any other information pertaining to current network conditions, and a network traffic filter may use the information to make various processing decisions. In an embodiment, filters may make use of shared contextual data to coordinate decisions that affect application behavior. For example, a first filter could add contextual data to a shared application context and a second filter could examine the data to determine processing actions to perform.

As described above, a network traffic filter may be initially specified by a user in a filter source code file comprising logic to be processed by a proxy server application that has loaded the filter source code file. In an embodiment, the logic included in a filter source code file representing a network traffic filter may comprise the specification of a filter type, an execution order value, processing criteria, and one or more processing actions. In general, a proxy server application processes each loaded network traffic filter by determining whether the filter's specified processing criteria are satisfied based on a received network message or other available information as input, and in response to determining that the specified processing criteria are satisfied, causing the one or more specified processing actions to be performed. In an embodiment, if a particular network traffic filter's processing criteria are not satisfied, processing of the particular network traffic filter ends and the proxy server application continues processing any network traffic filters remaining to be processed.

In an embodiment, filter types specified in network traffic filter source code files define logical groupings of the loaded network traffic filters with each grouping corresponding to a particular point or event during the handling of a network message. In an embodiment, the groupings of network traffic filters form one or more network traffic filter chains, with the network traffic filters included in a particular filter chain processed as a group in response to the occurrence of the associated network message handling point or event. In an embodiment, a user may add a new or updated network traffic filter to an existing network filter chain by specifying a filter type value representing the existing network filter chain in the corresponding filter source code file.

As described above, in an embodiment, one example filter type may be associated with a pre-processing phase of handling a network request. In an embodiment, the processing actions associated with pre-processing network traffic filters may perform one or more processing steps in response to receiving a request message and before the request message is sent to an origin server. For example, processing actions specified in a pre-processing network traffic filter may include logic that authenticates, validates, or throttles received network messages, logs or stores other auditing information about a received network message, or that modifies the contents or other aspects of a network message.

In an embodiment, another example filter type may be associated with the phase of dispatching received network requests to one or more origin servers. The processing actions specified in a dispatch network traffic filter may include, for example, logic determining a particular origin server to send a received network request. For example, dispatch network traffic filters may implement load balancing policies by specifying logic that distributes received requests across multiple redundant origin servers.

Figure 3B:
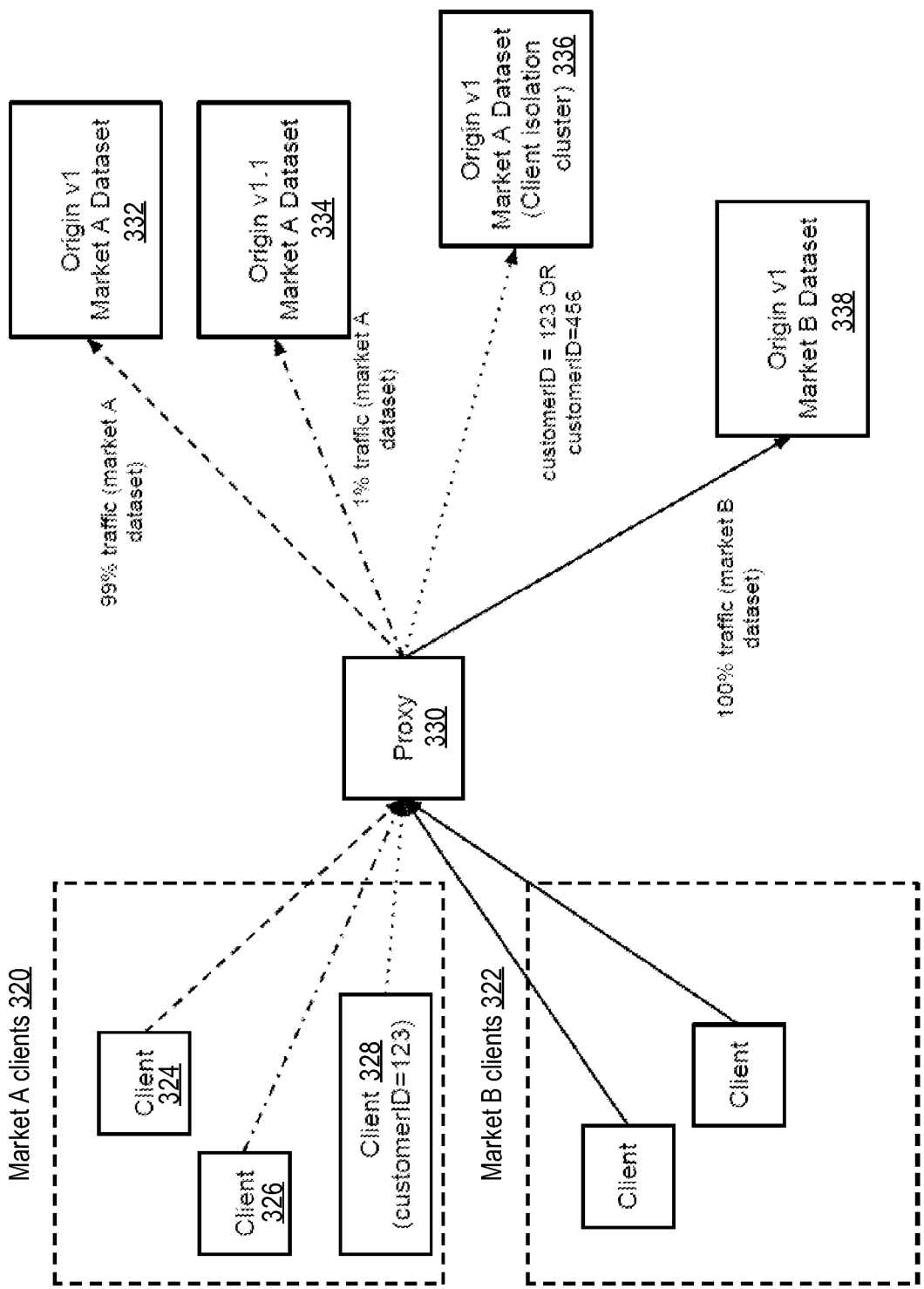
FIG. 3B illustrates examples of a proxy server application routing network requests in a network, according to an embodiment.

FIG. 3B illustrates examples of a proxy server application routing network requests in a network, according to an embodiment. The network illustrated in FIG. 3B includes two groups of clients, market A clients 320 and market B client 322, a proxy server 330, and origin servers 332, 334, 336, 338. Market A clients 320 and market B clients 322 may, for example, refer to groupings of client devices that may be grouped based on access to particular services or resources provided by the origin servers, particular geographic regions, client device types, or any other characteristics. In FIG. 3B, client devices associated with either market A clients 320 or market B clients 322 may send requests for resources or services provided by one or more of origin servers 332, 334, 336, and 338, with the requests traversing through a proxy server application running on proxy server 330.

In FIG. 3B, the various dashed and solid lines connecting client devices in market A clients 320 and market B clients 322 with proxy server 330 and origin servers 332, 334, 336, 338 represent respective paths that requests from the client devices may follow, according to an embodiment. In an embodiment, the respective request paths may be determined in part based on one or more dispatch network traffic filters processed by proxy server 330. As described above, the dispatch network traffic filters include logic to direct received requests to one or more origin servers depending on various characteristics associated with the request or other information.

For example, client device 324 from market A clients 320 may send a request for a particular resource or service and that traverses through proxy server 330. In response to receiving the request, the proxy server application running on proxy server 330 may process one or more network traffic filters, including one or more dispatch network traffic filters. Based on processing the one or more dispatch network traffic filters, the proxy server application may determine that the request received from client device 324 is to be routed to origin server 332, which provides the requested resource or service to market A clients. For example, a dispatch network traffic filter may determine that a request from client device 324 is to be routed to origin server 332 based on one or more characteristics of the request that identify client device 324 as a market A client such as, for example, an Internet Protocol (IP) address, a service or user identifier value, or any other characteristic.

Similarly, client requests from client devices associated with market B clients 322 may be routed to origin server 338 which provides a requested resource or service to market B clients, as illustrated by the solid lines connecting the client devices in market B clients 322 to proxy server 330 and origin server 338.

As another example, proxy server 330 may receive a request from client device 326 and send the received request to origin server 334. In the example of FIG. 3B, origin server 334 may represent an origin server configured as an alternative origin server to origin server 332. For example, origin server 334 may be configured for the purposes of testing a newer version of provided resources, services, or other components associated with origin server 332. In an embodiment, a dispatch network traffic filter processed by proxy server 330 may direct one or more particular requests received by proxy server 330 to origin server 334 instead of origin server 332 based on, for example, random sampling, particular times of day, or any other conditions or characteristics associated with a request. In this manner, a dispatch network traffic filter may be configured at proxy server 330 to direct a portion of received requests to origin server 334 in order to provide a controlled test the updated services on origin server 334.

In an embodiment, client device 328 represents a client device that may be associated with a particular user or group of users, as illustrated by the depicted customerID value "123." In an embodiment, proxy server 330 may receive a request from client device 328 and a processed network traffic filter may identify the request as associated with the particular user or group of users. Based on identifying that the request is associated with a particular user or group of users, the dispatch network traffic filter may direct the request to origin server 336 instead of origin server 332 or origin server 334. Origin server 336 may, for example, be configured to isolate requests from particular users for debugging, security, or other analysis purposes.

The routing examples described above and illustrated in FIG. 3B are provided only as examples, and dispatch network traffic filters may be configured to implement any arbitrary routing decisions and policies.

In an embodiment, another example filter type may be associated with a post-processing phase of handling a network request corresponding to the receipt of a response message from an origin server and before the response is sent back to the requesting client. Example processing actions that may be specified in post-processing network traffic filters include injecting information into the response message headers, modifying the contents of the response, delaying delivery of the response, injecting additional markup in the response message content, measuring of processing time by the origin servers, and re-sending network messages to origin servers in response to errors.

In an embodiment, network traffic filters comprise processing criteria that determine whether the processing actions specified in the filter are to be performed in response to the particular network message or event. For example, the processing criteria for a network traffic filter may comprise a function that determines, based on one or more characteristics of a received network message, contextual data generated by other network traffic filters, or other event information, whether the specified criteria are satisfied. In an embodiment, processing criteria may be evaluated based on information contained in a network message including, for example, a type of device that generated the network message, a network address associated with the network message, a particular resource requested by the network message, or any other information associated with the network message. In an embodiment, a processing criteria function may return a Boolean value of true or false depending on whether or not the processing criteria are satisfied.

In an embodiment, network traffic filters comprise one or more processing actions that perform one or more processing steps relative to a received network message. In an embodiment, a proxy server application is configured to execute the processing actions for a particular network traffic filter in response to the processing criteria for the particular network traffic filter being satisfied. The processing actions specified by a network traffic filter may perform virtually any operation on a network message or other accessible data elements, including validating the network message, authenticating the network message, modifying the network message, caching the network message, storing information associated with the network message, sending the network message to one or more second network elements, delaying transmission of the network message, or other functions. In general, the processing actions defined in a particular network traffic filter relate to a particular phase or event in the handling of network messages associated with the filter type specified in the particular network traffic filter.

In an embodiment, network traffic filters may comprise an execution order value that determines an order to evaluate each particular network traffic filter relative to other network traffic filters in the same filter chain. For example, it may be desired that certain network traffic filters in a particular filter chain are processed earlier in the filter chain than others. For example, filters related to authentication in a pre-processing filter chain could be executed first. In an embodiment, the execution order values may be specified as numerical values that define an execution order based on the relative ordering of the numerical values. For example, network traffic filters specifying smaller numbers relative to other network traffic filters may be processed earlier in a filter chain than those filters specifying larger numbers. Numerical ordering is used as an example, however, and in other embodiments other values that define an ordering may be used.

FIG. 4 illustrates an example of a network traffic filter source code file 400 comprising various code segments that provide examples of the components of a network traffic filter as described herein. Network traffic filter source code file 400 comprises examples of a filter type specification 402, execution order value specification 404, processing condition function 406, and processing actions function 408.

Filter type specification 402 illustrates an example function that returns a value indicating the filter type to be associated with the network traffic filter based on filter source code file 400. In the example, the network traffic filter source code file 400 specifies a filter type of "pre", indicating that the network traffic filter represented by the filter source code file is to be part of a "pre-processing" filter chain.

Execution order value specification 404 illustrates an example function that returns an execution order value. In the example, the function is configured to return a value of "5." As a result, the network traffic filter based on filter source code file 400 may be processed after network traffic filters in the "pre-processing" filter chain that specify an execution order value that is less than 5, but processed before network traffic filters specifying a value that is greater than 5.

Processing condition function 406 illustrates example specified processing criteria that determine whether the filter processing actions are to be performed. In the example of filter source code file 400, processing condition function 406 evaluates whether a "deviceID" parameter associated with a received request matches a particular known device identification string "vendortv." During processing of a network traffic filter based on filter source code file 400, if a received request message includes a "deviceID" parameter indicating a value of "vendortv", processing condition function returns a Boolean value of true, otherwise returning a value of false.

Processing actions function 408 illustrates example processing actions to be performed in response to determining that a particular network message satisfies the processing criteria in processing condition function 406. In the example, processing actions function 408 causes a proxy server application processing the network traffic filter represented by filter source code file 400 to suspend execution for a random time period. For example, the processing actions specified in the example processing actions function 408 may be useful in the event that a proxy server is receiving a large number of simultaneous requests, possibly due to a synchronized polling interval, from a particular type of device and throttling of the requests is desired to distribute the polling intervals over a wider period of time. In the example, in response to receiving requests that are determined to be from the particular type of device, the requests may be delayed for a random period of time in order not to bombard the origin servers with numerous requests at once.

3.2 Overview of Example Operation

Figure 5:
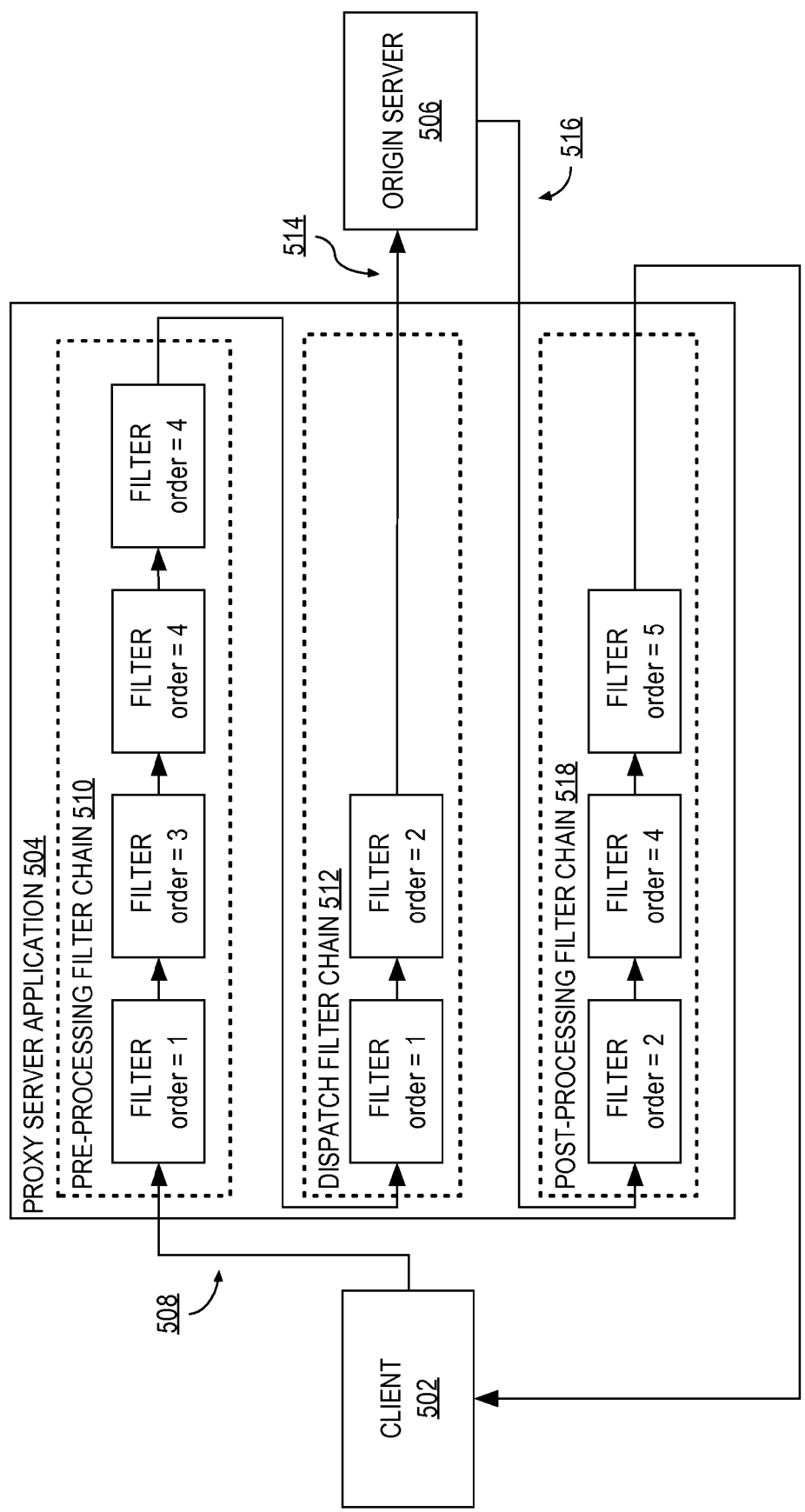
FIG. 5 illustrates an example processing flow of a network request by proxy server application.

FIG. 5 illustrates a flow of a network message processed by a proxy server application of the present disclosure. In FIG. 5, a proxy server (not illustrated) comprising proxy server application 504 is configured to intercept a request 508 sent by a client 502 to an origin server 506. For example, request 508 may be an HTTP request for a resource hosted by origin server 506. As network messages are intercepted by the proxy server, the network messages are processed by proxy server application 504.

In FIG. 5, proxy server application 504 receives a request 508 from client 502. In an embodiment, in response to receiving request 508, proxy server application 504 begins processing request 508 using a pre-processing filter chain 510. In an embodiment, proxy server application 504 processes the network traffic filters associated with pre-processing filter chain 510 in an order determined by execution order values specified by the pre-processing network traffic filters. In the example of FIG. 5, the four network traffic filters included in pre-processing filter chain 510 specify execution order values of 1, 3, 4, and 4, respectively, and are processed in that order. In an embodiment, the network traffic filters specifying the same execution order value may be executed in an arbitrary order.

In an embodiment, proxy server application 504 processes pre-processing filter chain 510 by determining, for each particular network traffic filter in the filter chain, whether request 508 satisfies the processing criteria associated with the particular network traffic filter. For example, the first network traffic filter may include processing criteria that evaluate access credentials expected in request 508. As another example, the processing criteria for the second network traffic filter may specify particular information expected in one or more headers of request 508. In response to proxy server application 504 determining that the processing criteria associated with a particular network traffic filter are satisfied, proxy server application 504 causes the processing actions associated with the particular network traffic filter to be performed. In response to request 508, for example, any number of the processing actions associated with the network traffic filters in pre-processing filter chain 510 may be performed depending on satisfaction of the processing criteria in each of the filters.

In FIG. 5, after each of the network traffic filters in pre-processing filter chain 510 are processed, proxy server application 504 proceeds to process the network traffic filters in a dispatch filter chain 512. In general, the network traffic filters in dispatch filter chain 512 are responsible for dispatching the request 508 to an appropriate origin server. The processing criteria for network traffic filters in dispatch filter chain 512 may be based on one or more characteristics associated with request 508 including an originating network address, user identification included in the request, originating device type identification, characteristics of the data contained in the request, contextual data generated by other network traffic filters, or any other characteristic associated with request 508. As a result of processing request 508 by dispatch filter chain 512, request 508 is sent as request 514 to an origin server 506. Dispatched request 514 may differ from the original request 508 according to any modifications made to request 508 by the network traffic filters in pre-processing filter chain 510 and dispatch filter chain 512.

Origin server 506 processes request 514 and sends back response 516 to the proxy server. In FIG. 5, in response to receiving response 516, proxy server application 504 processes network traffic filters in a post-processing filter chain 518. During processing of post-processing filter chain 518, proxy server application 504 similarly evaluates the processing criteria for each of the network traffic filters in post-processing filter chain 518 and may perform one or more post-processing steps relative to response 516. In response to the processing criteria for one or more of the network traffic filters being satisfied, the network traffic filters of post-processing filter chain 518 may modify various aspects of response 516 before sending response 516 back to the requesting client 502. For example, one of the network traffic filters in post-processing filter chain 518 may inject headers into response 516 in order to enable cross-origin resource sharing (CORS).

Figure 6:
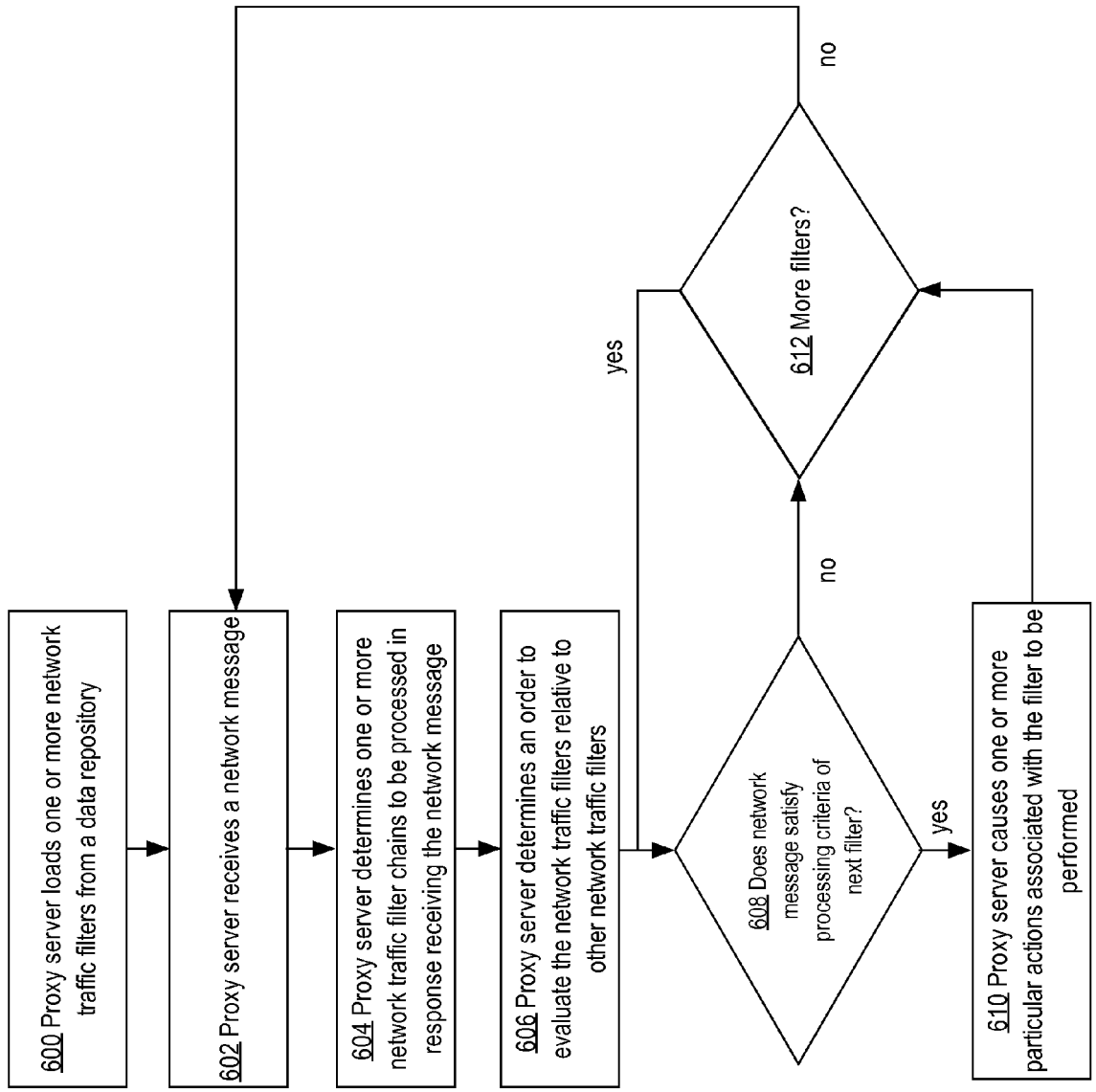
FIG. 6 illustrates a method of processing network messages by proxy server.

FIG. 6 illustrates a method of processing network messages received by a proxy server comprising a proxy server application as described herein. At block 600, a proxy server loads one or more network traffic filters from a filter repository.

At block 602, the proxy server receives a network message. For example, the request may be a request from a client directed toward an origin server, or a response message from an origin server destined for a client device. At block 604, the proxy server determines one or more network traffic filter chains to be processed in response to receiving the network message. For example, the proxy server may determine "pre-processing" and "dispatch" filter chains are to be processed in response to receiving a request message from a client. In another example, in response to receiving a response message from an origin server, the proxy server may determine that a "post-processing" network traffic filter chain is to be processed.

At block 606, the proxy server determines an order to evaluate the network traffic filters relative to the other network traffic filters in each network traffic filter chain. In an embodiment, the processing order is determined based on the proxy server receiving one or more execution order values. The proxy server processes the network traffic filters in an order that is determined based on the received execution order values.

At block 608, the proxy server determines, for the next network traffic filter of a filter chain selected for processing, whether the network message satisfies particular processing criteria associated with the next network traffic filter. For example, the proxy server may determine that a network message satisfies the particular processing criteria based on determining a type of device that generated the network message, determining a network address associated with the network message, or determining a resource requested by the network message. The information contained in the network message for evaluation may be found, for example, in a network message header or in the body of the network message, or based on any other characteristics of the network message.

If the network message satisfies the particular processing criteria, at block 610, the proxy server causes one or more particular actions associated with the network traffic filter to be performed. For example, the particular actions may include one or more of: modifying the network message, caching the network message, storing information associated with the network message, sending the network message to one or more second network elements, and causing the sending of the network message to be delayed, or triggering the execution of another filter chain.

At block 612, after a particular network traffic filter is processed in either block 608 or block 610, the proxy server determines whether there are more network traffic filters to be processed. In response to determining that there are more network traffic filters to be processed, the processing criteria of the next traffic filter are evaluated at block 608. Otherwise, the proxy server awaits the receipt of further network messages in block 602.

4.0 Implementation Mechanisms—Hardware Overview

Figure 7:
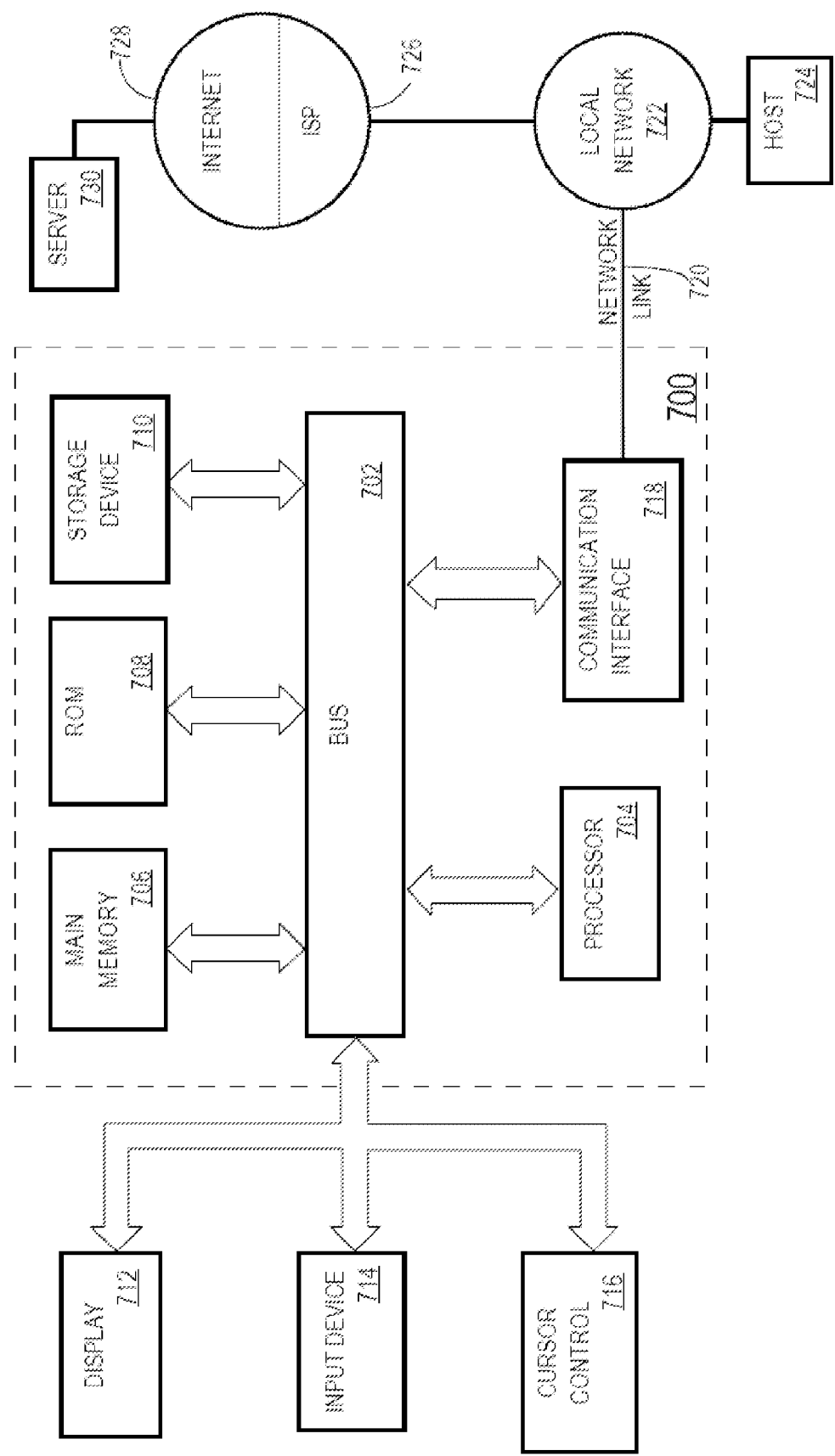
FIG. 7 illustrates a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

5.0 Other Aspects of Disclosure

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Aspects of the subject matter described herein are set out in the following numbered clauses:

1. A method comprising: in a proxy server that is configured to receive requests directed toward one or more origin servers and to distribute the requests to one or more of the origin servers for processing, loading, from a data repository, one or more first network traffic filters, wherein each of the one or more first network traffic filters comprises an executable unit of computer program code specifying processing criteria and one or more actions; while the proxy server is executing and without ending execution of the proxy server, performing one or more of: loading and initiating operation of one or more second network traffic filters; removing one or more of the first network traffic filters; reordering one or more of the first network traffic filters; receiving, at the proxy server, a network message; for a particular network traffic filter of the one or more first network traffic filters, wherein the particular network traffic filter comprises particular processing criteria and one or more particular actions: determining whether the network message satisfies the particular processing criteria; in response to determining that the network message satisfies the particular processing criteria, causing the one or more particular actions to be performed; wherein the method is performed on one or more computing devices.

2. The method of clause 1, wherein the one or more first network traffic filters comprise: a first network traffic filter chain comprising one or more pre-processing network traffic filters that are configured to process the requests before the requests are distributed to the one or more of the origin servers; a second network traffic filter chain comprising one or more dispatch network traffic filters that are configured to distribute the requests to the one or more of the origin servers; and a third network traffic filter chain comprising one or more post-processing network traffic filters that are configured to process responses returned by the one or more origin servers before the response is sent to the requesting client.

3. The method of any of clauses 1-2, wherein the one or more first network traffic filters further comprise: a fourth network traffic filter chain comprising one or more static network traffic filters that are configured to process requests and return response messages without distributing the requests to the one or more of the origin servers; and a fifth network traffic filter chain comprising one or more error network traffic filters that are configured to process errors generated by one or more other network traffic filters.

4. The method of any of clauses 1-3, wherein the one or more particular actions include one or more of: validating the network message, authenticating the network message, modifying the network message, caching the network message, storing information associated with the network message, sending the network message to one or more second network elements, causing the sending or delivery of the network message to be delayed, modifying application behavior, replying to the network message.

5. The method of any of clauses 1-4, wherein the determining whether the network message satisfies the particular processing criteria includes examining one or more of: a header associated with the network message, a message body associated with the network message, contextual data generated by one or more of the first network traffic filters and second network traffic filters.

6. The method of any of clauses 1-5, wherein the determining whether the network message satisfies the particular specified criteria includes determining one or more of: a type of device that generated the network message, a network address associated with the network message, a resource requested by the network message, a geographic location associated with a client generating the network message, a user associated with the network message.

7. The method of any of clauses 1-6, wherein determining whether the network message satisfies the particular specified criteria is based at least in part on one or more of: random sampling, algorithmic sampling.

8. The method of any of clauses 1-7, wherein the proxy server loading one or more first network traffic filters further comprises: the proxy server receiving one or more execution order values, wherein each execution order value determines an order to evaluate a particular network traffic filter relative to the other first network traffic filters; the proxy server ordering the first network traffic filters according to the received execution order values.

9. The method of any of clauses 1-8, wherein the proxy server loading one or more first network traffic filters comprises loading one or more network traffic filter source code files.

10. The method of clause 9, wherein each of the one or more network traffic filter source code files further comprises logic specifying one or more of: a filter type, an execution order value, processing criteria, and one or more processing actions.

11. A non-transitory computer-readable data storage medium storing one or more sequences of instructions which when executed cause one or more processors to perform any of the methods recited in clauses 1-10

12. A computer program product including instructions which, when implemented on one or more processors, carries out any of the methods recited in clauses 1-10.

13. A computing device having a processor configured to perform any of the methods recited in clauses 1-10.

What is claimed is:

1. A method comprising:
in a proxy server that is configured to receive requests directed toward one or more origin servers and to distribute the requests to one or more of the origin servers for processing, loading, from a data repository, one or more first network traffic filters, wherein each of the one or more first network traffic filters comprises an executable unit of computer program code specifying processing criteria and one or more actions;
while the proxy server is executing and without ending execution of the proxy server, performing one or more of: loading and initiating operation of one or more second network traffic filters; removing one or more of the first network traffic filters; reordering one or more of the first network traffic filters;
receiving, at the proxy server, a network message;
for a particular network traffic filter of the one or more first network traffic filters, wherein the particular network traffic filter comprises particular processing criteria and one or more particular actions:
determining whether the network message satisfies the particular processing criteria;
in response to determining that the network message satisfies the particular processing criteria, causing the one or more particular actions to be performed;
wherein the method is performed on one or more computing devices.

2. The method of claim 1, wherein the one or more first network traffic filters comprise one or more of:
a first network traffic filter chain comprising one or more pre-processing network traffic filters that are configured to process the requests before the requests are distributed to the one or more of the origin servers;
a second network traffic filter chain comprising one or more dispatch network traffic filters that are configured to distribute the requests to the one or more of the origin servers; and
a third network traffic filter chain comprising one or more post-processing network traffic filters that are configured to process responses returned by the one or more of the origin servers before the response is sent to a requesting client.

3. The method of claim 2, wherein the one or more first network traffic filters further comprise one or more of:
a fourth network traffic filter chain comprising one or more static network traffic filters that are configured to process requests and return response messages without distributing the requests to the one or more of the origin servers; and
a fifth network traffic filter chain comprising one or more error network traffic filters that are configured to process errors generated by one or more other network traffic filters.

4. The method of claim 1, wherein the one or more particular actions include one or more of: validating the network message, authenticating the network message, modifying the network message, caching the network message, storing information associated with the network message, sending the network message to one or more second network elements, causing the sending or delivery of the network message to be delayed, modifying application behavior, replying to the network message.

5. The method of claim 1, wherein the determining whether the network message satisfies the particular processing criteria includes examining one or more of: a header associated with the network message, a message body associated with the network message, contextual data generated by one or more of the first network traffic filters and second network traffic filters.

6. The method of claim 1, wherein the determining whether the network message satisfies the particular specified criteria includes determining one or more of: a type of device that generated the network message, a network address associated with the network message, a geographic location associated with a client generating the network message, a user associated with the network message, a resource requested by the network message.

7. The method of claim 1, wherein determining whether the network message satisfies the particular specified criteria is based at least in part on one or more of: random sampling, algorithmic sampling.

8. The method of claim 1, wherein the proxy server loading one or more first network traffic filters further comprises:
the proxy server receiving one or more execution order values, wherein each execution order value determines an order to evaluate a particular network traffic filter relative to the other first network traffic filters;
the proxy server ordering the first network traffic filters according to the received execution order values.

9. The method of claim 1, wherein the proxy server loading, from the data repository, one or more first network traffic filters further comprises loading one or more network traffic filter source code files.

10. The method of claim 9, wherein each of the one or more network traffic filter source code files specifies one or more of: a filter type, an execution order value, processing criteria, and one or more processing actions.

11. A non-transitory computer-readable data storage medium storing one or more sequences of instructions which when executed cause one or more processors to perform, in a proxy server that is configured to receive requests directed toward one or more origin servers and to distribute the requests to one or more of the origin servers for processing:
loading, from a data repository, one or more first network traffic filters, wherein each of the one or more first network traffic filters comprises an executable unit of computer program code specifying processing criteria and one or more actions;
while the proxy server is executing and without ending execution of the proxy server, performing one or more of: loading and initiating operation of one or more second network traffic filters; removing one or more of the first network traffic filters; reordering one or more of the first network traffic filters;
receiving, at the proxy server, a network message;
for a particular network traffic filter of the one or more first network traffic filters, wherein the particular network traffic filter comprises particular processing criteria and one or more particular actions:
determining whether the network message satisfies the particular processing criteria;
in response to determining that the network message satisfies the particular processing criteria, causing the one or more particular actions to be performed.

12. The non-transitory computer-readable data storage medium of claim 11, wherein the one or more first network traffic filters comprise one or more of:
a first network traffic filter chain comprising one or more pre-processing network traffic filters that are configured to process the requests before the requests are distributed to the one or more of the origin servers;
a second network traffic filter chain comprising one or more dispatch network traffic filters that are configured to distribute the requests to the one or more of the origin servers; and
a third network traffic filter chain comprising one or more post-processing network traffic filters that are configured to process responses returned by the one or more of the origin servers before the response is sent to the requesting client.

13. The non-transitory computer-readable data storage medium of claim 12, wherein the one or more first network traffic filters further comprise one or more of:
a fourth network traffic filter chain comprising one or more static network traffic filters that are configured to process requests and return response messages without distributing the requests to the one or more of the origin servers; and
a fifth network traffic filter chain comprising one or more error network traffic filters that are configured to process errors generated by one or more other network traffic filters.

14. The non-transitory computer-readable data storage medium of claim 11, wherein the one or more particular actions include one or more of: validating the network message, authenticating the network message, modifying the network message, caching the network message, storing information associated with the network message, sending the network message to one or more second network elements, causing the sending or delivery of the network message to be delayed.

15. The non-transitory computer-readable data storage medium of claim 11, wherein the determining whether the network message satisfies the particular processing criteria includes examining one or more of: a header associated with the network message, a message body associated with the network message, contextual data generated by one or more of the first network traffic filters and second network traffic filters.

16. The non-transitory computer-readable data storage medium of claim 11, wherein the determining whether the network message satisfies the particular specified criteria includes determining one or more of: a type of device that generated the network message, a network address associated with the network message, a resource requested by the network message, a geographic location associated with a client generating the network message, a user associated with the network message.

17. The non-transitory computer-readable data storage medium of claim 11, wherein determining whether the network message satisfies the particular specified criteria is based at least in part on one or more of: random sampling, algorithmic sampling.

18. The non-transitory computer-readable data storage medium of claim 11, further comprising instructions which, when executed by the one or more processors, cause the one or more processors to perform:
the proxy server receiving one or more execution order values, wherein each execution order value determines an order to evaluate a particular network traffic filter relative to the other first network traffic filters;
the proxy server ordering the first network traffic filters according to the received execution order values.

19. The non-transitory computer-readable data storage medium of claim 18, wherein the proxy server loading, from the data repository, one or more first network traffic filters further comprises loading one or more network traffic filter source code files.

20. The non-transitory computer-readable data storage medium of claim 18, wherein each of the one or more network traffic filter source code files specifies one or more of: a filter type, an execution order value, processing criteria, and one or more processing actions.

* * * * *